(12) United States Patent
Datema et al.

(10) Patent No.: US 12,472,661 B2
(45) Date of Patent: Nov. 18, 2025

(54) MIXER DRUM DRIVE WITH ADDITIONAL PUMP

(71) Applicant: Oshkosh Corporation, Oshkosh, WI (US)

(72) Inventors: Bryan Datema, Rochester, MN (US); David Ilgert, Oshkosh, WI (US); Robert Varao, Oshkosh, WI (US); Yanming Hou, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1334 days.

(21) Appl. No.: 17/158,662

(22) Filed: Jan. 26, 2021

(65) Prior Publication Data

US 2021/0237312 A1 Aug. 5, 2021

Related U.S. Application Data

(60) Provisional application No. 62/968,581, filed on Jan. 31, 2020.

(51) Int. Cl.
*B28C 5/42* (2006.01)
*B60L 1/00* (2006.01)
*B60L 53/50* (2019.01)
*B60P 3/16* (2006.01)

(52) U.S. Cl.
CPC .......... *B28C 5/4272* (2013.01); *B28C 5/4213* (2013.01); *B28C 5/422* (2013.01); *B28C 5/4268* (2013.01); *B60L 1/003* (2013.01); *B60L 53/50* (2019.02); *B60P 3/16* (2013.01)

(58) Field of Classification Search
CPC ....... B28C 5/4272; B28C 5/4213; B28C 5/42; B28C 5/422; B60L 1/003; B60P 3/16
See application file for complete search history.

(56) References Cited

U.S. PATENT DOCUMENTS

| | | |
|---|---|---|
| 7,578,379 B2 | 8/2009 | Gillmore et al. |
| 7,648,015 B2 | 1/2010 | Gillmore et al. |
| 7,931,397 B2 | 4/2011 | Lindblom et al. |
| 8,287,173 B2 | 10/2012 | Khouri |
| 8,613,543 B2 | 12/2013 | Lindblom et al. |
| 8,646,965 B2 | 2/2014 | Datema et al. |
| D737,866 S | 9/2015 | Datema et al. |
| 9,145,905 B2 | 9/2015 | Hou |
| D772,306 S | 11/2016 | Datema et al. |
| 9,494,170 B2 | 11/2016 | Hou |
| 9,694,671 B2 | 7/2017 | Wildgrube et al. |
| 10,196,205 B2 | 2/2019 | Betz et al. |
| 10,239,403 B2 | 3/2019 | Broker et al. |

(Continued)

FOREIGN PATENT DOCUMENTS

JP 2003301802 A * 10/2003 .......... B28C 5/4213

*Primary Examiner* — Marc C Howell
(74) *Attorney, Agent, or Firm* — Foley & Lardner LLP (57) ABSTRACT

A vehicle includes an engine, an electric energy system, a drum configured to mix drum contents received therein, and a drum drive system coupled to the drum and the engine. The drum drive system includes a primary pump, an electric motor powered by the electric energy system, an auxiliary pump fluidly coupled to the mechanical pump and powered by the electric motor, and a drum motor fluidly coupled to the primary pump and the auxiliary pump and positioned to drive the drum to agitate the drum contents.

19 Claims, 5 Drawing Sheets

(56) References Cited

U.S. PATENT DOCUMENTS

| | | |
|---|---|---|
| 10,414,067 B2 | 9/2019 | Datema et al. |
| 10,792,613 B1 | 10/2020 | Drake et al. |
| 10,843,379 B2 | 11/2020 | Rocholl et al. |
| 10,858,184 B2 | 12/2020 | Betz et al. |
| 10,901,409 B2 | 1/2021 | Datema et al. |
| 10,940,610 B2 | 3/2021 | Clifton et al. |
| 10,987,829 B2 | 4/2021 | Datema et al. |
| 2010/0226197 A1* | 9/2010 | Zenne ............... B28C 5/421 366/60 |
| 2011/0224858 A1* | 9/2011 | Bissontz ............ B60K 28/165 180/65.265 |
| 2013/0111892 A1* | 5/2013 | Takahashi ............ F15B 7/006 60/459 |
| 2014/0010036 A1* | 1/2014 | Takahashi ........... B28C 5/4213 366/61 |
| 2014/0013736 A1* | 1/2014 | Takahashi ............ F16D 33/00 60/428 |
| 2014/0015315 A1* | 1/2014 | Takahashi ........... B60R 16/0307 307/10.1 |
| 2015/0047335 A1* | 2/2015 | Takahashi ........... F16H 61/0031 60/428 |
| 2015/0217481 A1* | 8/2015 | Takahashi ........... B28C 5/4213 366/61 |
| 2015/0306786 A1* | 10/2015 | Pirri ................. B60W 10/30 366/60 |
| 2016/0250774 A1* | 9/2016 | Takahashi ........... B28C 5/4213 366/61 |
| 2018/0250847 A1 | 9/2018 | Wurtz et al. |
| 2019/0217698 A1 | 7/2019 | Broker et al. |
| 2019/0344475 A1 | 11/2019 | Datema et al. |
| 2020/0230841 A1 | 7/2020 | Datema et al. |
| 2020/0230842 A1 | 7/2020 | Datema et al. |
| 2020/0290237 A1 | 9/2020 | Steffens et al. |
| 2020/0316816 A1 | 10/2020 | Messina et al. |
| 2020/0317083 A1 | 10/2020 | Messina et al. |
| 2021/0031649 A1 | 2/2021 | Messina et al. |
| 2021/0039719 A1 | 2/2021 | Datema et al. |
| 2021/0069934 A1 | 3/2021 | Rocholl et al. |
| 2021/0086991 A1 | 3/2021 | Betz et al. |
| 2021/0107179 A1 | 4/2021 | Glunz |
| 2021/0124347 A1 | 4/2021 | Datema et al. |

\* cited by examiner

MIXER DRUM DRIVE WITH ADDITIONAL PUMP

CROSS-REFERENCE TO RELATED PATENT APPLICATIONS

The present application claims the benefit of and priority to U.S. Provisional Patent Application No. 62/968,581, filed Jan. 31, 2020, the entire disclosure of which is hereby incorporated by reference herein.

BACKGROUND

Concrete mixing vehicles are configured to receive, mix, and transport wet concrete or a combination of ingredients that when mixed form wet concrete to a job site. Concrete mixing vehicles include a rotatable mixing drum that mixes the concrete disposed therein.

SUMMARY

One embodiment relates to a vehicle. The vehicle includes an engine, an electric energy system, a drum configured to mix drum contents received therein, and a drum drive system coupled to the drum and the engine. The drum drive system includes a primary pump, an electric motor powered by the electric energy system, an auxiliary pump fluidly coupled to the mechanical pump and powered by the electric motor, and a drum motor fluidly coupled to the primary pump and the auxiliary pump and positioned to drive the drum to agitate the drum contents. In at least one embodiment, the vehicle further includes a control system coupled to the engine and the drum drive system. The control system may be configured to (i) receive an operating status of the vehicle; (ii) receive a target rotational speed of the drum; and (iii) activate the electric motor based on the operating status and the target rotational speed.

Another embodiment relates to an auxiliary drum drive system. The auxiliary drum drive system includes a battery, an electric motor electrically connected to the battery, an auxiliary pump mechanically coupled to the electric motor, and a controller communicably coupled to the electric motor. The auxiliary pump is fluidly couplable to a hydraulic circuit of a concrete mixing vehicle that includes a drum motor and a primary pump. The controller is configured to (i) receive an operating status of the concrete mixing vehicle; (ii) receive a target rotational speed of a drum of the concrete mixing vehicle; and (iii) activate the electric motor based on the operating status and the target rotational speed.

Another embodiment relates to a method of controlling a drum drive system of a vehicle. The method includes receiving, from a sensor onboard the vehicle, a first operating status of the vehicle, and receiving a target rotational speed of a drum of the vehicle. The drum is configured to mix drum contents received within the drum. The method also includes generating a first control signal to activate a primary pump of the vehicle to (i) engage the primary pump with an engine of the vehicle, and (ii) activate a drum motor that is fluidly coupled to the primary pump. The method additionally includes receiving, from the sensor, a second operating status of the vehicle that is different from the first operating status. The method further includes, in response to receiving the second operating status, generating a second control signal to activate an electric motor onboard the vehicle to (i) activate an auxiliary pump that is mechanically coupled to the electric motor, and (ii) activate the drum motor that is fluidly coupled to the auxiliary pump.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a concrete mixing vehicle includes a drum assembly having a mixing drum, a drum drive system, and a drum control system. The drum control system may be configured to control the drum drive system to rotate the mixing drum at a target speed. According to an exemplary embodiment, the drum drive system is a hydraulic drum drive system having an auxiliary pump powered by an electric motor, a primary pump powered by an engine of the concrete mixing vehicle, and a drum motor fluidly coupled to both the auxiliary pump and the mechanical pump.

According to an exemplary embodiment, the electric motor and auxiliary pump form part of a power pack (e.g., an accessory power unit, etc.) that may be retrofit onto a conventional, mechanically driven (e.g., original equipment) concrete mixing vehicle hydraulic system. The power pack includes a power source (e.g., battery), an electric motor that is electrically connected to the battery, and an electrically driven pump that is mechanically coupled to the electric motor. In some embodiments, the battery forms part of an electric energy system onboard the concrete mixing vehicle. The auxiliary pump is fluidly couplable to the hydraulic system, to the drum motor in line and/or in parallel with the conventional mechanically driven hydraulic pump.

According to an exemplary embodiment, the power pack additionally includes a control system (e.g., controller) configured to control operation of the electric motor and auxiliary pump based on an operational status of the concrete mixing vehicle. In particular, the control system is configured to activate the electric motor and auxiliary pump during periods in which the engine is decoupled from the primary pump (e.g., when the vehicle is stationary at a jobsite, when the vehicle is loading a concrete slurry or mixture, etc.). In this scenario, the electrical motor can be used to reduce engine wear, fuel consumption, and operating noise. In other embodiments, the control system is configured to operate the electric motor and electrically driven pump in combination with the primary pump, to increase the maximum operating speed of the drum without increasing the operating speed of the engine.

In some embodiments, the hydraulic drum drive system has two degrees of freedom to facilitate optimizing, balancing, and synchronizing the speed, the torque, and the load of critical components of the drum drive system. In other words, the displacement of both the auxiliary pump and the drum motor may be independently varied. For example, the auxiliary pump may implement an electrical displacement control system that varies the displacement of the pump based on a current and/or voltage supplied to the auxiliary pump by the battery and/or electric energy system.

A conventional drum drive system typically includes a hydrostatic drive that functions as both the power source and the speed control device for drum drives. Hydrostatic drives may offer fast response, can maintain precise speed under varying loads, and allow continuously variable speed ratio control. A basic hydrostatic drive is a complete closed loop hydraulic circuit containing a primary pump and a drum motor. The primary pump is typically a reversible variable-displacement pump. The primary pump may be coupled to and driven by a power-take-off ("PTO") shaft coupled to an engine of the vehicle. The drum motor is conventionally a fixed displacement motor. The drum motor may be coupled to the drum through a ratio reduction gearbox, pulley system, or otherwise coupled thereto. The primary pump may include a built-in device to adjust the pump displacement and flow direction.

The drum assembly may be operable in multiple working modes. The drum may be operated through a wide speed range, from lower than 1 revolution-per-minute ("rpm") in a transportation mode (e.g., while the vehicle is moving, etc.) to above 18 rpm in a loading mode and/or a mixing mode. While in a discharging mode, it may be desirable to have the lowest possible drum speed to achieve accurate discharging. The mixing mode of the drum may require the hydrostatic drive to provide a speed range over 20:1 (e.g., the highest speed of the drum divided by the lowest speed of the drum, etc.). The max speed range of a standard hydrostatic pump is about 10:1 due to maximum pump displacement, pressure limit, and/or torque limit thereof. A fixed displacement motor has a fixed speed and therefore the speed range thereof is fixed (e.g., 1:1, etc.) based on the pump output provided thereto. Therefore, the engine has to run over its full speed range (approximately 3:1) to meet application requirements for the mixing mode. In the loading mode and/or the mixing mode, the engine speed will typically run at the high idle (up to maximum governed speed). In the discharging mode, the engine may run near the low idle or independent of drum operation if the vehicle is being driven.

The limited speed ratio range of a typical/conventional hydrostatic drive presents severe drawbacks in concrete mixing. Concrete mixing vehicle have engines that are sized mainly for acceleration and climbing the most severe uphill grades at maximum load. In concrete mixing operations, the required power is typically about one third of the engine capacity. Running at high idle results in poor fuel efficiency. Other than unnecessary fuel consumption, more emissions, more noise, and reduced engine life are all byproducts. Moreover, because the hydrostatic drive uses a mechanically driven (e.g., engine driven) pump, the engine must operate at all times to prevent the concrete mixture from hardening within the drum. This includes periods during which concrete is being loaded into the drum and also periods in which the vehicle is unloading the concrete mixture from the drum at a jobsite. Much of the horsepower that can be provided by the engine is wasted during periods in which the vehicle is stationary.

Another issue is the accuracy of concrete discharging. Some applications prefer slow and accurate discharging rate. The engine may thereby be run at low idle to provide a flow discharge rate of mixture from the drum. However, the engine torque capacity becomes very weak at low idle and any load change causes engine speed fluctuations, which negatively affects the discharging accuracy.

According to an exemplary embodiment, the drum drive system of the present disclosure replaces and/or supplements the conventional primary pump and fixed and/or variable displacement motor with an electrically driven variable displacement pump that can be utilized to improve efficiency during certain periods of operation (e.g., at the jobsite, when loading concrete into the drum, etc.). The auxiliary pump may also be used in combination with the conventional primary pump, to prevent running the engine at high idle to increase drum speed (since the speed range of the drum drive system is a product of the pump speed range multiplied by the motor speed range). The drum drive system of the present disclosure also includes a control system that is configured to maintain the drum at a target operating speed, using the auxiliary pump.

Figure 1:
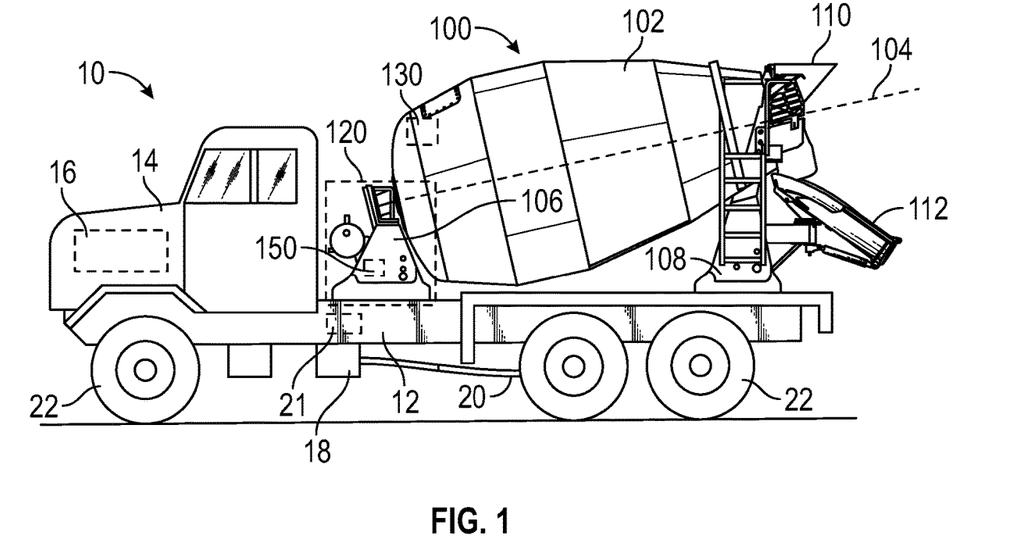
FIG. 1 is a side view of a concrete mixing truck with a drum assembly and a control system, according to an exemplary embodiment.

According to the exemplary embodiment shown in FIGS. 1-4, a vehicle, shown as concrete mixing truck 10, includes a drum assembly, shown as drum assembly 100. According to an exemplary embodiment, the concrete mixing truck 10 is configured as a rear-discharge concrete mixing truck. In other embodiments, the concrete mixing truck 10 is configured as a front-discharge concrete mixing truck. As shown in FIG. 1, the concrete mixing truck 10 includes a chassis, shown as frame 12, and a cab, shown as cab 14, coupled to the frame 12 (e.g., at a front end thereof, etc.). The drum assembly 100 is coupled to the frame 12 and disposed behind the cab 14 (e.g., at a rear end thereof, etc.), according to the exemplary embodiment shown in FIG. 1. In other embodiments, at least a portion of the drum assembly 100 extends in front of the cab 14. The cab 14 may include various components to facilitate operation of the concrete mixing truck 10 by an operator (e.g., a seat, a steering wheel, hydraulic controls, a user interface, switches, buttons, dials, etc.).

Figure 3:
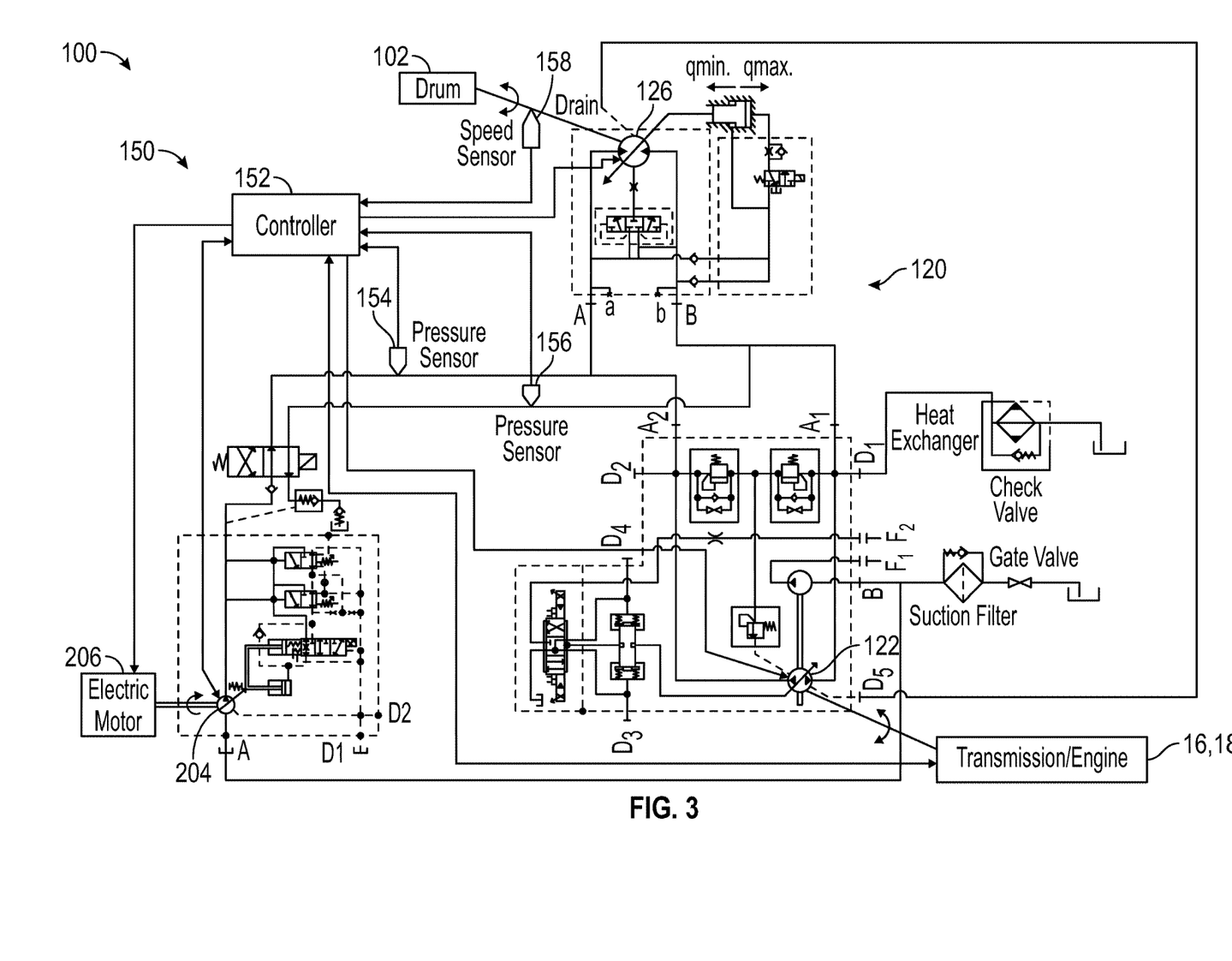
FIG. 3 is a schematic diagram of a drum drive system of the concrete mixing truck of FIG. 1, according to an exemplary embodiment.
Figure 4:
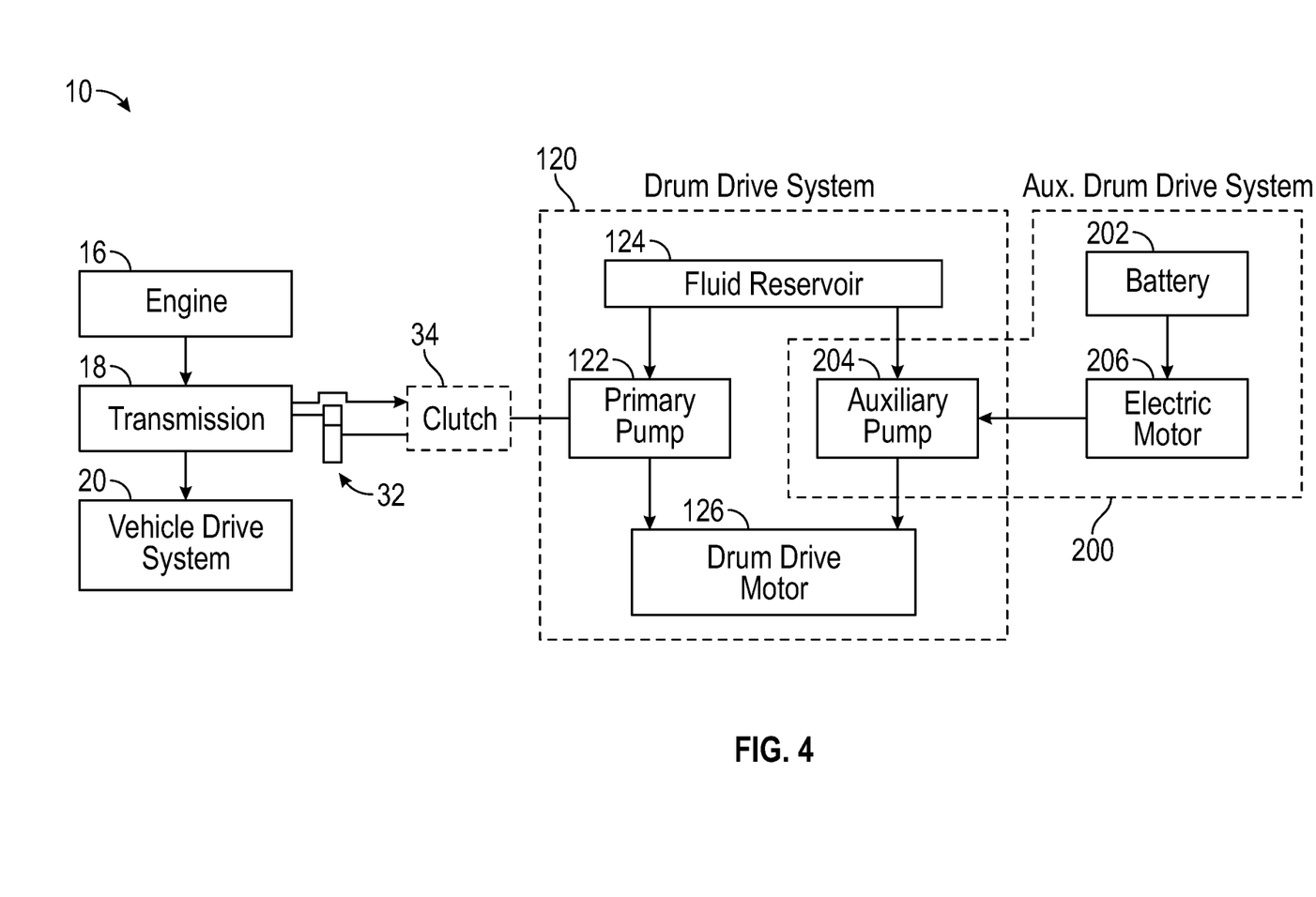
FIG. 4 is a power flow diagram for the concrete mixing truck of FIG. 1, according to an exemplary embodiment.

As shown in FIGS. 1, 3, and 4, the concrete mixing truck 10 includes a prime mover, shown as engine 16. As shown in FIG. 1, the engine 16 is coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, the engine 16 additionally or alternatively includes one or more electric drivetrain motors coupled to the frame 12 (e.g., a hybrid vehicle, an electric vehicle, etc.). The electric drivetrain motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to systems of the concrete mixing truck 10.

As shown in FIGS. 1 and 4, the concrete mixing truck 10 includes a power transfer device, shown as transmission 18. In one embodiment, the engine 16 produces mechanical power (e.g., due to a combustion reaction, etc.) that flows into the transmission 18. As shown in FIGS. 1 and 4, the concrete mixing truck 10 includes a first drive system, shown as vehicle drive system 20, that is coupled to the transmission 18. The vehicle drive system 20 may include drive shafts, differentials, and other components coupling the transmission 18 with a ground surface to move the concrete mixing truck 10. As shown in FIG. 1, the concrete mixing truck 10 includes a plurality of tractive elements, shown as wheels 22, that engage a ground surface to move the concrete mixing truck 10. In one embodiment, at least a portion of the mechanical power produced by the engine 16 flows through the transmission 18 and into the vehicle drive system 20 to power at least a portion of the wheels 22 (e.g., front wheels, rear wheels, etc.). In one embodiment, energy (e.g., mechanical energy, etc.) flows along a first power path defined from the engine 16, through the transmission 18, and to the vehicle drive system 20.

Figure 2:
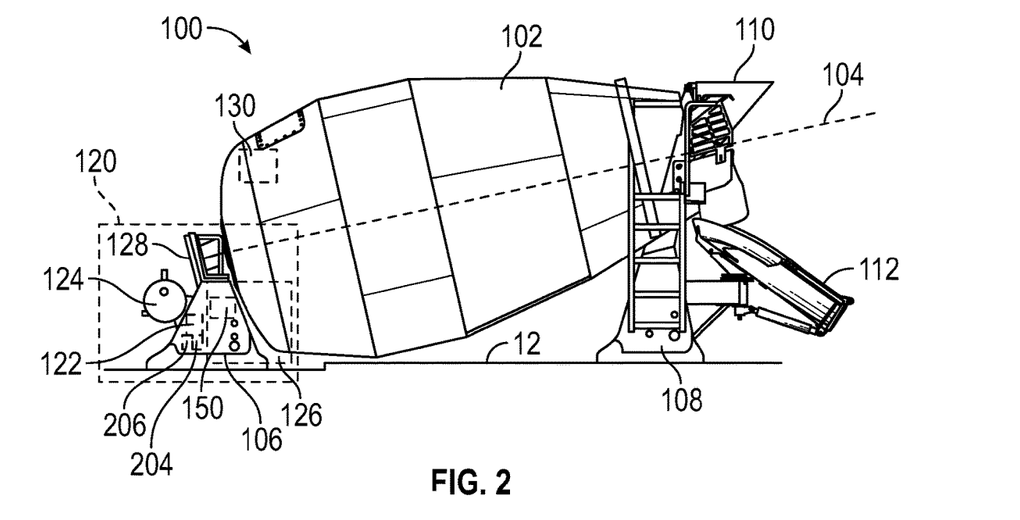
FIG. 2 is a detailed side view of the drum assembly of the concrete mixing truck of FIG. 1, according to an exemplary embodiment.

As shown in FIGS. 1-3, the drum assembly 100 of the concrete mixing truck 10 includes a drum, shown as mixing drum 102. The mixing drum 102 is coupled to the frame 12 and disposed behind the cab 14 (e.g., at a rear and/or middle of the frame 12, etc.). As shown in FIGS. 1-4, the drum assembly 100 includes a second drive system, shown as drum drive system 120, that is coupled to the frame 12. As shown in FIGS. 1 and 2, the concrete mixing truck 10 includes a first support, shown as front pedestal 106, and a second support, shown as rear pedestal 108. According to an exemplary embodiment, the front pedestal 106 and the rear pedestal 108 cooperatively couple (e.g., attach, secure, etc.) the mixing drum 102 to the frame 12 and facilitate rotation of the mixing drum 102 relative to the frame 12. In an alternative embodiment, the drum assembly 100 is configured as a stand-alone mixing drum that is not coupled (e.g., fixed, attached, etc.) to a vehicle. In such an embodiment, the drum assembly 100 may be mounted to a stand-alone frame. The stand-alone frame may be a chassis including wheels that assist with the positioning of the stand-alone mixing drum on a worksite. Such a stand-alone mixing drum may also be detachably coupled to and/or capable of being loaded onto a vehicle such that the stand-alone mixing drum may be transported by the vehicle.

As shown in FIGS. 1 and 2, the mixing drum 102 defines a central, longitudinal axis, shown as axis 104. According to an exemplary embodiment, the drum drive system 120 is configured to selectively rotate the mixing drum 102 about the axis 104. As shown in FIGS. 1 and 2, the axis 104 is angled relative to the frame 12 such that the axis 104 intersects with the frame 12. According to an exemplary embodiment, the axis 104 is elevated from the frame 12 at an angle in the range of five degrees to twenty degrees. In other embodiments, the axis 104 is elevated by less than five degrees (e.g., four degrees, three degrees, etc.) or greater than twenty degrees (e.g., twenty-five degrees, thirty degrees, etc.). In an alternative embodiment, the concrete mixing truck 10 includes an actuator positioned to facilitate selectively adjusting the axis 104 to a desired or target angle (e.g., manually in response to an operator input/command, automatically according to a control scheme, etc.).

As shown in FIGS. 1 and 2, the mixing drum 102 of the drum assembly 100 includes an inlet, shown as hopper 110, and an outlet, shown as chute 112. According to an exemplary embodiment, the mixing drum 102 is configured to receive a mixture, such as a concrete mixture (e.g., cementitious material, aggregate, sand, etc.), with the hopper 110. As shown in FIGS. 1 and 2, the mixing drum 102 includes a port, shown as injection port 130. The injection port 130 may provide access into the interior of the mixing drum 102 to inject water and/or chemicals (e.g., air entrainers, water reducers, set retarders, set accelerators, superplasticizers, corrosion inhibitors, coloring, calcium chloride, minerals, and/or other concrete additives, etc.). According to an exemplary embodiment, the injection port 130 includes an injection valve that facilitates injecting the water and/or the chemicals from a fluid reservoir (e.g., a water tank, etc.) into the mixing drum 102 to interact with the mixture, while preventing the mixture within the mixing drum 102 from exiting the mixing drum 102 through the injection port 130. In some embodiments, the mixing drum 102 includes multiple injection ports 130 (e.g., two injection ports, three injection ports, etc.) configured to facilitate independently injecting different water and/or chemicals into the mixing drum 102. The mixing drum 102 may include a mixing element (e.g., fins, etc.) positioned within the interior thereof. The mixing element may be configured to (i) agitate the contents of mixture within the mixing drum 102 when the mixing drum 102 is rotated by the drum drive system 120 in a first direction (e.g., counterclockwise, clockwise, etc.) and (ii) drive the mixture within the mixing drum 102 out through the chute 112 when the mixing drum 102 is rotated by the drum drive system 120 in an opposing second direction (e.g., clockwise, counterclockwise, etc.).

As shown in FIGS. 2-4, the drum drive system 120 includes an first pump (e.g., an engine driven pump, a mechanically driven pump, etc.), shown as primary pump 122; a second pump (e.g., an electric motor driven pump, an electrically driven pump, etc.), shown as auxiliary pump 204; a reservoir, shown as fluid reservoir 124, fluidly coupled to the primary pump 122 and the auxiliary pump 204; and an actuator, shown as drum motor 126. As shown in FIGS. 3 and 4, the primary pump 122, the auxiliary pump 204, and the drum motor 126 are fluidly coupled. According to an exemplary embodiment, the drum motor 126 is a hydraulic motor, the fluid reservoir 124 is a hydraulic fluid reservoir, and the primary pump 122 and the auxiliary pump 204 are hydraulic pumps. The primary pump 122 and the auxiliary pump 204 may be configured to pump fluid (e.g., hydraulic fluid, etc.) stored within the fluid reservoir 124 to drive the drum motor 126.

In some embodiments, at least one of the primary pump 122 and the auxiliary pump 204 are fixed displacement pumps. According to an exemplary embodiment, the primary pump 122 and the auxiliary pump 204 are variable displacement hydraulic pumps (e.g., an axial piston pump, etc.) that have a pump stroke that is variable. As such, the primary pump 122 and the auxiliary pump 204 may be configured to provide hydraulic fluid at a flow rate that varies based on the pump stroke (e.g., the greater the pump stroke, the greater the flow rate provided to the drum motor 126, etc.). The pressure of the hydraulic fluid provided by the primary pump 122 and the auxiliary pump 204 may also increase in response to an increase in pump stroke (e.g., where pressure may be directly related to work load, higher flow may result in higher pressure, etc.). The pressure of the hydraulic fluid provided by the primary pump 122 and the auxiliary pump 204 may alternatively not increase in response to an increase in pump stroke (e.g., in instances where there is little or no work load, etc.).

According to an exemplary embodiment, the primary pump 122 includes a throttling element (e.g., a swash plate, etc.). The pump stroke of the primary pump 122 varies based on the orientation of the throttling element. In one embodiment, the pump stroke of the primary pump 122 varies based on an angle of the throttling element (e.g., relative to an axis along which the pistons move within the axial piston pump, etc.). By way of example, the pump stroke may be zero where the angle of the throttling element equal to zero. The pump stroke may increase as the angle of the throttling element increases. According to an exemplary embodiment, the variable pump stroke of the primary pump 122 provides a variable speed range of up to about 10:1. In other embodiments, the primary pump 122 is configured to provide a different speed range (e.g., greater than 10:1, less than 10:1, etc.).

In one embodiment, the auxiliary pump 204 also includes a throttling element. According to an exemplary embodiment, the pump stroke of the auxiliary pump 204 (e.g., the orientation of the throttling element, etc.) varies based on a current supplied to the auxiliary pump by an electric energy system 21 of the mixing truck 10 (see FIG. 4). In one embodiment, the electric energy system 21 is an energy storage and/or generation system that is configured to (a) receive, generate, and/or store power and (b) provide electric power to (i) an electric motor 25 to drive the auxiliary pump 204, (ii) electric actuators of the mixing truck 10 to facilitate operation thereof (e.g., lift actuators for the drum, etc.), and/or (iii) other electrically operated accessories of the mixing truck 10 (e.g., displays, lights, etc.). In some embodiments, the electric energy system 21 provides power to an electric drivetrain motor (not shown) to drive the wheels 22. As shown in FIG. 4, the electric energy system 21 may include one or more rechargeable batteries 202 (e.g., lithium-ion batteries, nickel-metal hydride batteries, lithium-ion polymer batteries, lead-acid batteries, nickel-cadmium batteries, etc.), capacitors, solar cells, generators, power buses, etc.

In one embodiment, the mixing truck 10 includes an alternator that uses a mechanical input from the engine to charge or otherwise power the batteries 202. In other embodiments, the mixing truck 10 includes an internal combustion generator that is separate from the engine, that utilizes one or more fuels (e.g., gasoline, diesel, propane, natural gas, hydrogen, etc.) to generate electricity to charge the electric energy system 21. For example, the concrete mixing truck 10 may include a compressed natural gas (CNG) system configured to power the batteries 202 and/or the auxiliary pump 204. The CNG system may include one or more tanks, capsules, containers, pressure vessels, cartridges, etc., that are mounted onto the concrete mixing truck 10 and supply fuel to the internal combustion engine (e.g., a CNG engine). The internal combustion engine uses the fuel (e.g., CNG) to produce mechanical energy, which can be converted to electrical energy through a generator. The electrical energy is output by the internal combustion generator to one, or a combination of the batteries 202 and the auxiliary pump 204 (e.g., an electric motor powering the auxiliary pump 204, etc.). In other embodiments, the internal combustion engine is directly mechanically connected to the auxiliary pump 204. In yet other embodiments, the electric energy system 21 may be charged via another form of on-board generator (e.g., a solar panel system, etc.), from an external power source (e.g., overhead power lines, mains power source through a charging input, etc.), and/or via a power regenerative braking system, and provide power to the electrically operated systems of the mixing truck 10. In some embodiments, the electric energy system 21 includes a heat management system (e.g., liquid cooling, heat exchanger, air cooling, etc.).

In one embodiment, the throttling element of the primary pump 122 and/or auxiliary pump 204 is movable between a stroked position (e.g., a maximum stroke position, a partially stroked position, etc.) and a destroked position (e.g., a minimum stoke position, a partially destroked position, etc.). According to an exemplary embodiment, an actuator is coupled to the throttling element of the primary pump 122 and/or auxiliary pump 204. The actuator may be positioned to move the throttling element between the stroked position and the destroked position. In some embodiments, the primary pump 122 and/or auxiliary pump 204 is configured to provide no flow, with the throttling element in a non-stroked position, in a default condition (e.g., in response to not receiving a stroke command, etc.). The throttling element may be biased into the non-stroked position. In some embodiments, the drum control system 150 is configured to provide a first command signal. In response to receiving the first command signal, the primary pump 122 and/or auxiliary pump 204 (e.g., the throttling element by the actuator thereof, etc.) may be selectively reconfigured into a first stroke position (e.g., stroke in one direction, a destroked position, etc.). In some embodiments, the drum control system 150 is configured to additionally or alternatively provide a second command signal. In response to receiving the second command signal, the primary pump 122 and/or auxiliary pump 204 (e.g., the throttling element by the actuator thereof, etc.) may be selectively reconfigured into a second stroke position (e.g., stroke in an opposing second direction, a stroked position, etc.). The pump stroke may be related to the position of the throttling element and/or the actuator.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the primary pump 122 and/or auxiliary pump 204 may overcome the resilient member to actuate the throttling element into the stroked position (e.g., by actuating movable elements of the valve into positions where a hydraulic circuit actuates the throttling element into the stroked position, etc.).

As shown in FIG. 4, the concrete mixing truck 10 includes a power takeoff unit, shown as power takeoff unit 32, that is coupled to the transmission 18. In another embodiment, the power takeoff unit 32 is coupled directly to the engine 16. In one embodiment, the transmission 18 and the power takeoff unit 32 include mating gears that are in meshing engagement. A portion of the energy provided to the transmission 18 flows through the mating gears and into the power takeoff unit 32, according to an exemplary embodiment. In one embodiment, the mating gears have the same effective diameter. In other embodiments, at least one of the mating gears has a larger diameter, thereby providing a gear reduction or a torque multiplication and increasing or decreasing the gear speed.

As shown in FIG. 4, the power takeoff unit 32 is selectively coupled to the primary pump 122 with a clutch 34. In other embodiments, the power takeoff unit 32 is directly coupled to the primary pump 122 (e.g., without clutch 34, etc.). In some embodiments, the concrete mixing truck 10 does not include the clutch 34. By way of example, the power takeoff unit 32 may be directly coupled to the primary pump 122 (e.g., a direct configuration, a non-clutched configuration, etc.). According to an alternative embodiment, the power takeoff unit 32 includes the clutch 34 (e.g., a hot shift PTO, etc.). In one embodiment, the clutch 34 includes a plurality of clutch discs. When the clutch 34 is engaged, an actuator forces the plurality of clutch discs into contact with one another, which couples an output of the transmission 18 with the primary pump 122. In one embodiment, the actuator includes a solenoid that is electronically actuated according to a clutch control strategy. When the clutch 34 is disengaged, the primary pump 122 is not coupled to (i.e., is isolated from) the output of the transmission 18. Relative movement between the clutch discs or movement between the clutch discs and another component of the power takeoff unit 32 may be used to decouple the primary pump 122 from the transmission 18.

In one embodiment, energy flows along a second power path defined from the engine 16, through the transmission 18 and the power takeoff unit 32, and into the primary pump 122 when the clutch 34 is engaged. When the clutch 34 is disengaged, energy flows from the engine 16, through the transmission 18, and into the power takeoff unit 32. The clutch 34 selectively couples the primary pump 122 to the engine 16, according to an exemplary embodiment. In one embodiment, energy along the first flow path is used to drive the wheels 22 of the concrete mixing truck 10, and energy along the second flow path is used to operate the drum drive system 120 (e.g., power the primary pump 122, etc.). By way of example, the clutch 34 may be engaged such that energy flows along the second flow path when the primary pump 122 is used to provide hydraulic fluid to the drum motor 126. When the primary pump 122 is not used to drive the mixing drum 102 (e.g., when the mixing drum 102 is empty, when the auxiliary pump 204 is activated at a job site, etc.), the clutch 34 may be selectively disengaged, thereby conserving energy. In embodiments without clutch 34, the mixing drum 102 may continue turning (e.g., at low speed) under power of the primary pump 122 when empty.

As shown in FIG. 4, the concrete mixing truck 10 additionally includes an auxiliary drum drive system, shown as auxiliary system 200. The auxiliary system 200 is configured to replace and/or supplement the hydraulic power provided to the drum motor 126 by the primary pump 122 during certain periods of operation. For example, the auxiliary system 200 may be configured to engage or otherwise activate the auxiliary pump 204 during periods in which the concrete mixing truck 10 is stationary (e.g., at the job site when unloading concrete, when loading concrete into the drum, etc.), so that the engine may be shut down. In other embodiments, the auxiliary system 200 may be configured to engage or otherwise activate the auxiliary pump 204 to supplement the power provided by the primary pump 122. For example, the auxiliary system 200 may be configured to engage or otherwise activate the auxiliary pump 204 to increase the rotational speed of the drum without increasing the speed of the engine. In another example, the auxiliary pump 204 (e.g., based on commands from the control system, etc.) may be configured to control the displacement and/or operating speed of the auxiliary pump 204 to minimize fluctuations in drum rotational speed that may be caused by fluctuations in engine operating speed (e.g., acceleration, deceleration, etc.), such that an approximately constant drum rotational speed is achieved regardless of the engine operating speed.

As shown in FIG. 4, the auxiliary system 200 includes the battery 202, an electric motor 206 that is electrically connected to the battery 202, and the auxiliary pump 204. The electric motor 206 is mechanically coupled to the auxiliary pump 204 and is configured to power the auxiliary pump 204. In some embodiments, the electric motor 206 may form part of the auxiliary pump 204 (e.g., the auxiliary pump 204 and the electric motor 206 may share the same housing, etc.). The auxiliary system 200 (e.g., the battery 202, the electric motor 206, and the auxiliary pump 204) may form a power pack (e.g., a portable kit, etc.) that may be retrofit or otherwise added to an existing original equipment concrete mixing truck 10. In other words, the auxiliary system 200 may be configured to integrate with existing hydraulic system infrastructure on the concrete mixing truck 10. The components of the auxiliary system 200 may be provided as individual components with connecting hardware (e.g., wires, mounting fasteners, etc.), and/or may be at least partially share a single housing. For example, one or more portions of the auxiliary system 200 may be contained in, enclosed in, support by, etc., a modular unit, an add-on unit, a removable unit, etc. As such, the auxiliary system 200 may be removably coupled to the concrete mixing truck 10 (e.g., to an underside of the concrete mixing truck 10, the frame 12, the front pedestal 106, the rear pedestal 108, and/or anywhere on the concrete mixing truck 10 that provides sufficient structural strength). In other embodiments, the auxiliary system 200 may include additional, fewer, and/or different components.

As shown in FIG. 4, the auxiliary pump 204 is fluidly couplable to the hydraulic system of the concrete mixing truck 10 (e.g., a hydraulic circuit of the truck, an existing original equipment drum drive system, etc.). In other words, the auxiliary pump 204 includes fluid connectors, valves, and/or other components to facilitate integration into the hydraulic system of the concrete mixing truck 10. As shown in FIG. 4, the auxiliary pump 204 is fluidly coupled to the drum motor 126 in parallel with the primary pump 122. In other embodiments, the auxiliary pump 204 may be positioned in line (e.g., in series) with the primary pump 122. An inlet to the auxiliary pump 204 is fluidly coupled to the fluid reservoir 124 of the drum drive system 120. The auxiliary pump 204 and/or the auxiliary system 200 may include valves (e.g., four way, two position solenoid valves, etc.) configured to selectively fluidly isolate the auxiliary pump 204 from other parts of the drum drive system 120 and/or to reverse the direction of fluid flow through the drum drive system 120.

The drum motor 126 is positioned to drive the rotation of the mixing drum 102. In some embodiments, the drum motor 126 is a fixed displacement motor. According to an exemplary embodiment, the drum motor 126 is a variable displacement motor. In one embodiment, the drum motor 126 operates within a variable speed range up to about 3:1 or 4:1. In other embodiments, the drum motor 126 is configured to provide a different speed range (e.g., greater than 4:1, less than 3:1, etc.). According to an exemplary embodiment, the speed range of the drum drive system 120 is the product of the speed range of each activated pump (e.g., the primary pump 122 and the auxiliary pump 204) and the speed range of the drum motor 126. For simplicity, the following discussion considers a scenario where the drum motor 126 is driven by the primary pump 122 only. However, the same operational relationship applies between the drum motor 126 and the auxiliary pump 204 (e.g., when the drum motor 126 is driven by the auxiliary pump 204 only). Together, the variable displacement primary pump 122 and the drum motor 126 may have a speed range that reaches up to 30:1 or 40:1 (e.g., without having to operate the engine 16 at a high idle condition, etc.). According to an exemplary embodiment, increased speed range of the drum drive system 120 having a variable displacement motor and a variable displacement pump relative to a drum drive system having a fixed displacement motor frees up boundary limits for the engine 16, the primary pump 122, and the drum motor 126. Advantageously, with the increased capacity of the drum drive system 120, the engine 16 does not have to run at either high idle or low idle during the various operating modes of the drum assembly 100 (e.g., mixing mode, discharging mode, filling mode, etc.), but rather the engine 16 may be operated at a speed that provides the most fuel efficiency and most stable torque. Also, the primary pump 122 and the drum motor 126 may not have to be operated at displacement extremes to meet the speed requirements for the mixing drum 102 during various applications, but can rather be modulated to the most efficient working conditions (e.g., by the drum control system 150, etc.).

As shown in FIG. 2, the drum drive system 120 includes a drive mechanism, shown as drum drive wheel 128, coupled to the mixing drum 102. The drum drive wheel 128 may be welded, bolted, or otherwise secured to the head of the mixing drum 102. The center of the drum drive wheel 128 may be positioned along the axis 104 such that the drum drive wheel 128 rotates about the axis 104. According to an exemplary embodiment, the drum motor 126 is coupled to the drum drive wheel 128 (e.g., with a belt, a chain, a gearing arrangement, etc.) to facilitate driving the drum drive wheel 128 and thereby rotate the mixing drum 102. The drum drive wheel 128 may be or include a sprocket, a cogged wheel, a grooved wheel, a smooth-sided wheel, a sheave, a pulley, or still another member. In other embodiments, the drum drive system 120 does not include the drum drive wheel 128. By way of example, the drum drive system 120 may include a gearbox that couples the drum motor 126 to the mixing drum 102. By way of another example, the drum motor 126 (e.g., an output thereof, etc.) may be directly coupled to the mixing drum 102 (e.g., along the axis 104, etc.) to rotate the mixing drum 102.

According to an exemplary embodiment, the speed of the mixing drum 102 is directly proportional to the speed of the drum motor 126 (e.g., based on gearing, pulley, etc. arrangement between the drum motor 126 and the drum drive wheel 128, etc.). The speed of the mixing drum 102 may be represented by following expression:

$$N_d \propto N_m = \frac{Q}{Dsp_m} \quad (1)$$

where $N_d$ is the speed of the mixing drum 102, $N_m$ is the speed of the drum motor 126, Q is the hydraulic fluid flow provided to the drum motor 126 by the primary pump 122 (and/or auxiliary pump 204), and $Dsp_m$ is the displacement of the drum motor 126. In a drum drive system where the drum actuator is a fixed displacement motor, the motor displacement is a constant and the speed of the drum motor 126, and thereby the speed of the mixing drum 102, is based solely on the hydraulic fluid flow provided by the primary pump 122 (and/or auxiliary pump 204). Advantageously, the drum drive system 120 of the present disclosure includes a variable displacement drum motor 126 such that the speed of the mixing drum 102 is based on the hydraulic fluid flow provided by the primary pump 122 and the displacement of the drum motor 126.

The hydraulic fluid flow provided by the primary pump 122 to the drum motor 126 may be represented by the following expression:

$$Q = N_p \cdot Dsp_p \quad (2)$$

where $N_p$ is the speed of the primary pump 122 and $Dsp_p$ is the displacement of the primary pump 122. Since the primary pump 122 is driven by the engine 16 with the power takeoff unit 32, the speed of the primary pump 122 is proportional to the speed of the engine 16 (e.g., approximately a 1:1 ratio, etc.), and thereby the hydraulic fluid flow is proportional to the speed of the engine 16. In contrast, the speed of the auxiliary pump 204 can be controlled separately from the engine speed via the electric motor 206. A pump with higher displacement will provide more flow. However, increasing the displacement of a pump increases the size, weight, and cost thereof. Larger pumps also have a much lower allowable working speed because of the eccentric force from the increase in mass. Typically, the smallest pump to meet the work requirement is selected for the primary pump 122 and the engine is typically operated at the high idle when high drum speed is needed. However, this leads to various disadvantageous such unnecessary fuel consumption, more emissions, increased noise, reduced engine life, etc. The drum motor 126 having variable displacement alleviates the aforementioned disadvantages of a drum drive system having a fixed displacement motor.

According to an exemplary embodiment, the drum motor 126 has a torque capacity that is capable of meeting the most severe work load experienced by the drum assembly 100. The torque capacity of the drum motor 126 may be represented by the following expression:

$$T_m = Dsp_m \cdot P_Q \quad (3)$$

where $T_m$ is the torque of the drum motor 126 and $P_Q$ is the pressure of the hydraulic fluid flow provided to the drum motor 126 by the primary pump 122 (and/or auxiliary pump 204). A similar expression may be used to represent the torque capacity of the primary pump 122. The primary pump 122 and the drum motor 126 may have a threshold working pressure (e.g., 5000 pounds-per-square-inch ("psi"), etc.). The energy required to operate the mixing drum 102 at a certain speed may be represented by the following expression:

$$HP = N_m \cdot T_m = P_Q \cdot Q \quad (4)$$

where HP is the horsepower of the drum drive system 120.

The most severe workloads appear when the mixing drum 102 is in acceleration, braking, and/or discharging (e.g., where the speed of the mixing drum 102 is in low to medium range, etc.). In a loading mode or a mixing mode, the speed of the mixing drum 102 is high but stable. The torque required for the loading and mixing modes is typically less than half of the most severe loads. During low speed and high torque conditions, the drum motor 126 may be configured to operate in a large displacement setting to provide the required torque. In a high speed but relative stable torque condition, the drum motor 126 may be configured to operate at a reduced displacement so as to require less flow for the same rotating speed. Then, the speed of the primary pump 122, and thereby the speed of the engine 16 may be reduced.

By way of example, during an initial stage of operation, the drum motor 126 may be operated at 100% displacement and the system pressure may be at 2000 psi. The primary pump 122 may also be operated at 100% displacement. The engine may be operated at a high idle speed of 2000 rpm. Now, if the displacement of the drum motor 126 is reduced to 50% of the maximum amount of displacement, only half of the original hydraulic flow is needed to maintain the same motor speed, based on Equation (1). However, because the mixing drum 102 is still running with the same load at the same speed, the horsepower consumption will not change. From Equation (4), the system pressure will double with the same horsepower consumption and half the hydraulic fluid flow. Therefore, the system pressure will increase to 4000 psi from the original 2000 psi. Further, now that half of the original amount of hydraulic fluid flow is required, the primary pump 122 may be operated at half of the original speed thereof with the full displacement setting, based on Equation (2). As a result, the engine 16 may be operated at half of the high idle speed (e.g., 1000 rpm instead of 2000 rpm, etc.) since the speed of the primary pump 122 is proportional to the speed of the engine 16. Therefore, the drum drive system 120 is capable of providing the same horsepower output while at significantly lower engine speeds, which provides much better fuel efficiency, less emissions, decreased operational noise, increased engine life, etc. Similarly, the auxiliary system 200 further improves fuel efficiency, emissions, operational noise, and engine life, by eliminating and/or augmenting the power provided to the drum motor 126 by the primary pump 122, at least during periods in which the engine 16 is decoupled from the transmission 18 (e.g., at the job site, or when the concrete mixing truck 10 is otherwise stationary).

By way of another example, concretes may not always be low slump heavy materials. With high slump light concrete, the drum work load can be much lighter. The system pressure may only be at 1500 psi with the drum motor 126 at full displacement. The motor displacement can be further decreased to less than 50%, for example 40%. The system pressure may only be 3750 psi (e.g., which is less than the maximum allowable system pressure, etc.). Then, the engine 16 may be operated at a low idle speed (e.g., 800 rpm, etc.).

According to the exemplary embodiment shown in FIG. 3, the drum control system 150 for the drum assembly 100 of the concrete mixing truck 10 includes a controller, shown as drum assembly controller 152. In one embodiment, the drum assembly controller 152 is configured to selectively engage, selectively disengage, control, and/or otherwise communicate with components of the drum assembly 100 and/or the concrete mixing truck 10 (e.g., actively control the components thereof, etc.). As shown in FIG. 3, the drum assembly controller 152 is coupled to the engine 16, the primary pump 122, the electric motor 206, the auxiliary pump 204, the drum motor 126, a first pressure sensor 154, a second pressure sensor 156, and at least one speed sensor 158. The primary pump 122 is coupled to the engine 16 (e.g., by way of a PTO connection on a transmission 18 of the concrete mixing truck 10, etc.). In other embodiments, the drum assembly controller 152 is coupled to more or fewer components. For example, the drum assembly controller 152 may be coupled to the transmission 18, a speed sensor configured to determine an operating speed of the engine (e.g., revolutions per minute), a sensor configured to indicate whether the transmission 18 is coupled to the engine 16 or decoupled from the engine 16, and/or another sensor. The drum assembly controller 152 may be configured to regulate the speed of the engine 16, the displacement of the primary pump 122, the displacement of the auxiliary pump 204, the operating speed (e.g., rotational speed) of the electric motor 206, and/or the displacement of the drum motor 126 to provide a target speed (e.g., received from an operator, etc.) of the mixing drum 102. By way of example, the drum assembly controller 152 may send and receive signals with the engine 16, the primary pump 122, the electric motor 206, the auxiliary pump 204, the drum motor 126, the first pressure sensor 154, the second pressure sensor 156, and/or the speed sensor 158.

The drum assembly controller 152 may be implemented as hydraulic controls, a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to an exemplary embodiment, the drum assembly controller 152 includes a processing circuit having a processor and a memory. The processing circuit may include an ASIC, one or more FPGAs, a DSP, circuits containing one or more processing components, circuitry for supporting a microprocessor, a group of processing components, or other suitable electronic processing components. In some embodiments, the processor is configured to execute computer code stored in the memory to facilitate the activities described herein. The memory may be any volatile or non-volatile computer-readable storage medium capable of storing data or computer code relating to the activities described herein. According to an exemplary embodiment, the memory includes computer code modules (e.g., executable code, object code, source code, script code, machine code, etc.) configured for execution by the processor.

According to an exemplary embodiment, the drum assembly controller 152 is configured to regulate the engine speed, the pump displacement, and the motor displacement to provide a target drum speed, while maintaining the engine speed at a lowest possible level (or by turning the engine off under certain conditions) while using pump and motor displacement changes to achieve the target hydraulic fluid flow and hydraulic power demand. The control of the drum speed can be achieved by using a target drum speed error to calculate the pump and motor displacement changes with minor or no changes to the engine speed through a proportional-integral-derivative ("PID") based control strategy. A look-up table based or gain-scheduling, or other forms of control strategies can also be used to adjust the pump and motor displacement independently. In some embodiments, the drum assembly controller 152 is configured to operate the engine 16 at the lowest possible engine speed, the primary pump 122 and/or the auxiliary pump 204 at the lowest possible pump displacement, and the drum motor 126 at the highest possible motor displacement to achieve the target drum speed within constraints such as maximum hydraulic pressure, maximum engine torque/load, and maximum drum speed. To facilitate such control, the drum control system is configured to monitor (i) the working pressure of the hydraulic fluid flow on both sides of the drum motor 126 with the first pressure sensor 154 and the second pressure sensor 156, (ii) the speed of the drum motor 126 with the speed sensor 158 (i.e., which is proportional to the speed of the mixing drum 102), (iii) the speed of the engine 16, (iv) the torque of the engine 16, (v) the speed of the electric motor 206, (iv) the torque of the electric motor 206, and/or (v) a percent load on the drum drive system 120. Further details regarding a control strategy implemented by the drum assembly controller 152 are provided herein in relation to method 500 (FIG. 5), and also method 600 (FIG. 6). In other embodiments, the drum control system 150 does not employ pressure feedback control (e.g., employs open loop control, controls based on other feedbacks, hydraulic components with higher pressure operating conditions are employed, etc.). In still other embodiments, the drum control system 150 is configured to adjust the displacement of the drum motor 126 in response to at least one of (i) a torque of the engine 16, (ii) a load on the engine 16, and (iii) a power of the engine 16. In yet other embodiments, the drum control system is configured to adjust the displacement of the drum motor 126 in response to at least one of (i) a torque of the engine 16, (ii) a torque and a displacement of the primary pump 122, and (iii) a torque and a displacement of the auxiliary pump 204.

Figure 5:
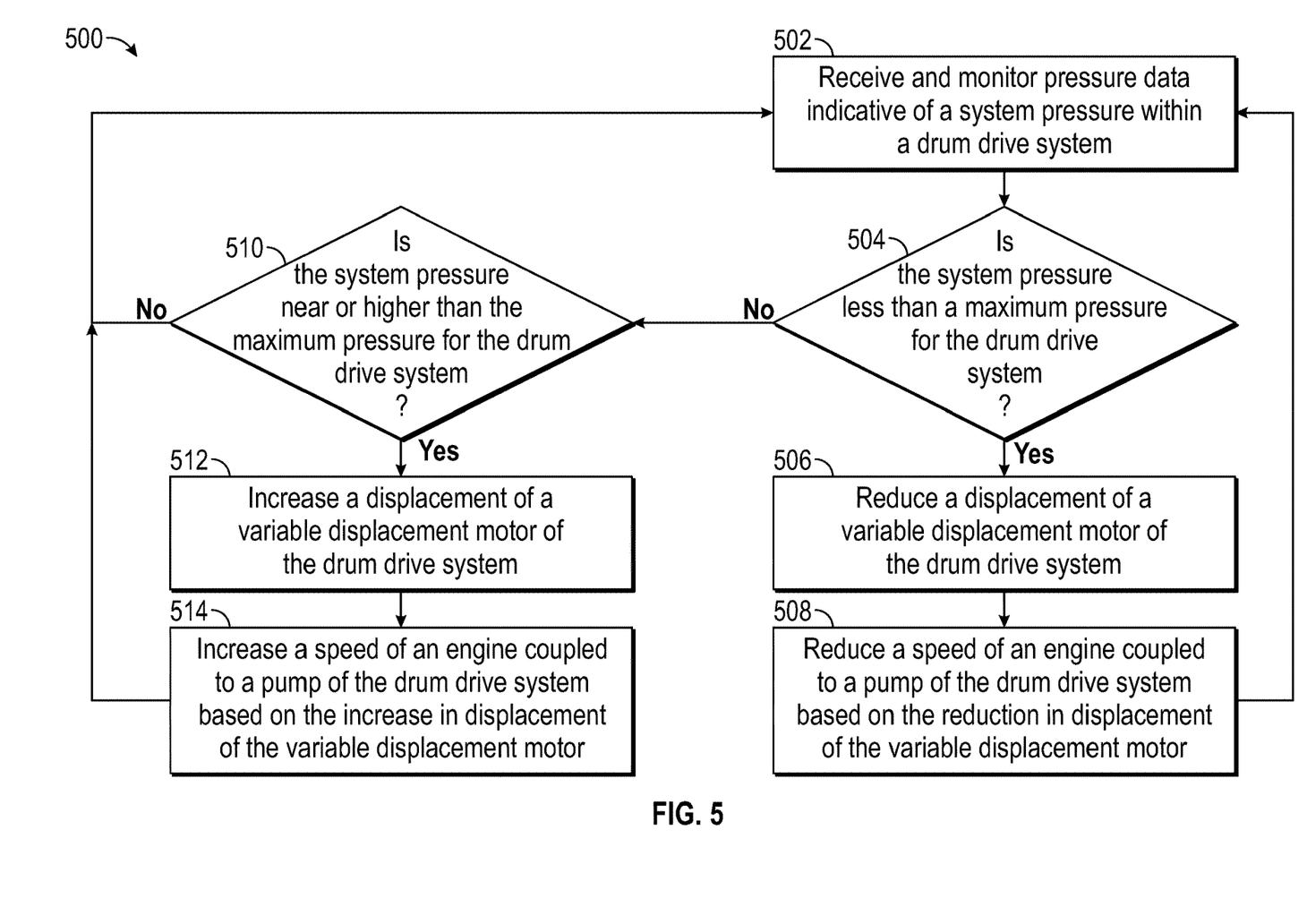
FIG. 5 is a flow diagram of a method for controlling a drum drive system having a variable displacement pump and a variable displacement motor, according to an exemplary embodiment.
Figure 6:
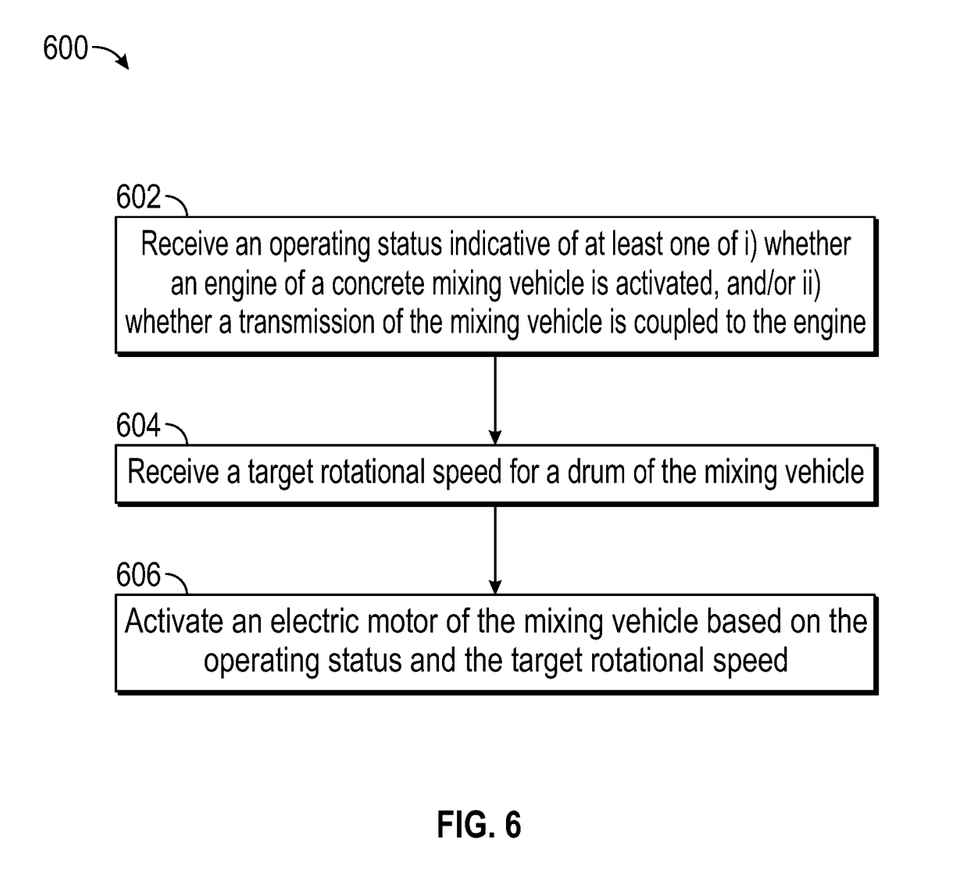
FIG. 6 is a flow diagram of a method for controlling an electric motor of an auxiliary drum drive system for a concrete mixing truck, according to an exemplary embodiment.

Referring now to FIG. 5, a method 500 for controlling a drum drive system having a variable displacement pump and a variable displacement motor to provide a target drum speed by modulating engine speed (and/or electric motor speed), pump displacement, and drum motor displacement, is shown according to an exemplary embodiment. The method may include maintaining the engine speed (and/or electric motor speed) at the lowest required level while actively controlling pump displacement and drum motor displacement to provide the required power demand to operate the drum at the target drum speed.

At block 502, a control system (e.g., the drum control system 150, the drum assembly controller 152, etc.) is configured to receive and monitor pressure data indicative of a system pressure (e.g., pressure of the hydraulic fluid flow, etc.) within a drum drive system (e.g., the drum drive system 120, etc.) from at least one pressure sensor (e.g., the first pressure sensor 154, the second pressure sensor 156, etc.). At block 504, the control system is configured to determine whether the system pressure is less than a maximum or threshold pressure (e.g., 5000 psi, etc.) for the drum drive system. If the system pressure is less than the maximum or threshold pressure (e.g., by more than a threshold difference, etc.), the control system is configured to proceed to block 506.

At block 506, the control system is configured to reduce a displacement of a variable displacement motor (e.g., the drum motor 126, etc.) of the drum drive system in response to the system pressure being less than the maximum or threshold pressure. At block 508, the control system is configured to reduce a speed of an engine and/or electric motor (e.g., the engine 16, the electric motor 206, etc.) coupled to a pump (e.g., the primary pump 122, the auxiliary pump 204, etc.) of the drum drive system based on the reduction in displacement of the variable displacement motor (e.g., if the speed of the engine is not at idle, unless the transmission of the vehicle is in drive and is then independently controlled based on vehicle driving needs, etc.). The control system may then return to block 502 to further reduce the speed of the engine and/or electric motor, if possible. If the system pressure is not less than a maximum or threshold pressure (e.g., 5,000 psi, etc.) for the drum drive system, the control system is configured to determine, at block 510, whether the system pressure is at or near the maximum or threshold pressure for the drum drive system. If the system pressure is at or near the maximum or threshold pressure for the drum drive system, the control system is configured to increase a displacement of a variable displacement drum motor of the drum drive system at block 512 and increase a speed of an engine and/or electric motor coupled to a pump of the drum drive system based on the increase in displacement of the variable displacement motor at block 514 and thereafter return to block 502.

According to an exemplary embodiment, reducing the displacement of the variable displacement motor will generate a higher system pressure. By way of example, reducing the displacement of the variable displacement motor requires less fluid flow to maintain the same speed of the variable displacement drum motor, and thereby maintain the speed of the drum (e.g., see Equation (1), etc.). However, because the drum needs to continue running with the same load at the same speed, the horsepower consumption to drive the drum does not change. With the same horsepower consumption and a reduced fluid flow, the system pressure will increase (e.g., see Equation (4), etc.). With the fluid flow reduced, the pump may be operated by the control system at a reduced speed while maintaining the current displacement setting thereof (e.g., see Equation (2), etc.). Since the speed of the pump is proportional to the speed of the engine, the control system may operate the engine at a reduced speed. Therefore, control system is configured to control the engine and/or electric motor, the pump, and the drum motor to provide the same horsepower output and drum speed while at significantly lower engine and/or electric motor speeds, which may provide increased fuel efficiency, reduced emissions, decreased operational noise, increased engine life, etc.

The controller 152 may also be configured to selectively activate the electric motor 206 (see FIG. 3) based on vehicle operating conditions. Referring to FIG. 6, a method 600 is shown for controlling the electric motor for a concrete mixing truck, according to an exemplary embodiment. At block 602, a controller (e.g., controller 152, etc.) receives an operating status of the concrete mixing truck (e.g., an engine status, a transmission status, etc.) that is indicative of one of (i) whether an engine of the concrete mixing truck is activated, or (ii) whether a transmission of the concrete mixing truck is coupled to the engine. In other words, the controller receives an indication of a vehicle operating condition for the concrete mixing truck (e.g., whether the truck is stationary, unloading concrete at a job site, loading concrete at a quarry or other distribution facility, etc.). Block 602 may include receiving data from the engine of the concrete mixing vehicle indicating that the engine has been deactivated, or that the transmission has been decoupled from the primary pump (e.g., primary pump 122).

At block 604, the controller receives a target speed for a drum of the concrete mixing truck. The target speed may vary depending on an operating condition of the concrete mixing truck. Block 604 may include receiving a load command indicating that the speed of the drum should be adjusted to receive a cement mixture, or an unload command indicating that the speed of the drum should be adjusted to dispense the cement mixture from the drum. In some embodiments, block 604 includes receiving a command from a user interface within the concrete mixing truck (e.g., operator commands, etc.). A block 606, the controller activates an electric motor (e.g., electric motor 206) based on the engine status and the target speed of the drum. Block 606 may include activating the electric motor based on a determination that the engine and/or transmission is decoupled from the primary pump. In other embodiment, block 606 may include adjusting the speed of the electric pump in a similar manner as described in method 500. In other embodiments, method 600 may include additional, fewer, and/or different operations.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, by way of example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A vehicle, comprising:
   an engine;
   an electric energy system;
   a drum configured to mix drum contents received therein;
   a drum drive system coupled to the drum and the engine, the drum drive system including:
      a primary pump mechanically coupled to the engine;
      an electric motor powered by the electric energy system;
      an auxiliary pump fluidly coupled to the primary pump and powered by the electric motor, the auxiliary pump being a variable displacement pump, the electric motor and the auxiliary pump forming part of an accessory power unit that is removably coupled to the vehicle, the accessory power unit further comprising a housing that is configured to enclose the electric motor and the auxiliary pump; and
      a drum motor fluidly coupled to the primary pump and the auxiliary pump and positioned to drive the drum to agitate the drum contents; and
   a control system communicably coupled to the drum drive system, the control system configured to:
      activate the electric motor based on an operating status of the vehicle; and
      control a displacement of the auxiliary pump to satisfy a target rotational speed of the drum without increasing an operating speed of the electric motor.

2. The vehicle of claim 1, wherein the electric energy system comprises:
   a battery electrically coupled to the electric motor; and
   an internal combustion generator that is separate from the engine and that utilizes a fuel to generate electricity to charge the battery.

3. The vehicle of claim 1, wherein the electric motor operates in parallel with the primary pump.

4. The vehicle of claim 1, wherein the control system is configured to control the displacement of the auxiliary pump based on at least one of a current or a voltage supplied to the auxiliary pump by the electric energy system.

5. The vehicle of claim 1, wherein the primary pump is a variable displacement pump, and wherein the drum motor is a variable displacement motor.

6. The vehicle of claim 1, wherein the control system is further configured to:
receive the target rotational speed of the drum; and
activate the electric motor based on the operating status and the target rotational speed.

7. The vehicle of claim 6, wherein the operating status is an engine operating speed.

8. The vehicle of claim 6, wherein the operating status is indicative of whether the engine is activated or deactivated, and wherein the control system is configured to activate the electric motor in response to the engine being deactivated and based on the target rotational speed.

9. The vehicle of claim 6, wherein the operating status is indicative of whether a transmission of the vehicle is coupled to the engine or decoupled from the engine, and wherein the control system is configured to activate the electric motor in response to the transmission being decoupled from the engine and based on the target rotational speed.

10. A vehicle, comprising:
an engine;
an electric energy system;
a drum configured to mix drum contents received therein;
a drum drive system coupled to the drum and the engine, the drum drive system including:
a primary pump mechanically coupled to the engine;
an electric motor powered by the electric energy system;
an auxiliary pump fluidly coupled to the primary pump and powered by the electric motor, the auxiliary pump being a variable displacement pump; and
a drum motor fluidly coupled to the primary pump and the auxiliary pump and positioned to drive the drum to agitate the drum contents; and
a control system communicably coupled to the drum drive system and the engine, the control system configured to:
activate the electric motor based on an operating status of the vehicle;
control a displacement of the auxiliary pump to satisfy a target rotational speed of the drum without increasing an operating speed of the electric motor, and
when the primary pump is operating, control the displacement of the auxiliary pump to satisfy the target rotational speed of the drum without increasing the operating speed of both the electric motor and the engine.

11. The vehicle of claim 10, wherein the electric energy system comprises:
a battery electrically coupled to the electric motor; and
an internal combustion generator that is separate from the engine and that utilizes a fuel to generate electricity to charge the battery.

12. The vehicle of claim 10, wherein the electric motor operates in parallel with the primary pump.

13. The vehicle of claim 10, wherein the control system is configured to control the displacement of the auxiliary pump based on at least one of a current or a voltage supplied to the auxiliary pump by the electric energy system.

14. The vehicle of claim 10, wherein the primary pump is a variable displacement pump, and wherein the drum motor is a variable displacement motor.

15. The vehicle of claim 10, wherein the control system is further configured to:
receive the target rotational speed of the drum; and
activate the electric motor based on the operating status and the target rotational speed.

16. The vehicle of claim 15, wherein the operating status is an engine operating speed.

17. The vehicle of claim 15, wherein the operating status is indicative of whether the engine is activated or deactivated, and wherein the control system is configured to activate the electric motor in response to the engine being deactivated and based on the target rotational speed.

18. The vehicle of claim 15, wherein the operating status is indicative of whether a transmission of the vehicle is coupled to the engine or decoupled from the engine, and wherein the control system is configured to activate the electric motor in response to the transmission being decoupled from the engine and based on the target rotational speed.

19. The vehicle of claim 15, wherein the electric motor, and the auxiliary pump form part of an accessory power unit that is removably coupled to the vehicle, the accessory power unit further comprising a housing that is configured to enclose the electric motor and the auxiliary pump.

\* \* \* \* \*